United States Patent
Li (10) Patent No.: US 12,058,095 B2
(45) Date of Patent: Aug. 6, 2024

(54) PROCESSING METHOD AND DEVICE FOR EXTERNAL LINK REWRITING

(71) Applicant: Hillstone Networks Co., Ltd., Jiangsu (CN)

(72) Inventor: Juxi Li, Jiangsu (CN)

(73) Assignee: Hillstone Networks Co., Ltd., Jiangsu (CN)

( * ) Notice: Subject to any disclaimer, the term of this patent is extended or adjusted under 35 U.S.C. 154(b) by 0 days.

(21) Appl. No.: 17/437,058

(22) PCT Filed: Dec. 25, 2020

(86) PCT No.: PCT/CN2020/139481
§ 371 (c)(1),
(2) Date: Sep. 8, 2021

(87) PCT Pub. No.: WO2022/134016
PCT Pub. Date: Jun. 30, 2022

(65) Prior Publication Data
US 2024/0015131 A1    Jan. 11, 2024

(51) Int. Cl.
*H04L 61/251* (2022.01)
*H04L 101/659* (2022.01)

(52) U.S. Cl.
CPC ...... *H04L 61/251* (2013.01); *H04L 2101/659* (2022.05)

(58) Field of Classification Search
CPC ....... H04L 9/40; H04L 67/141; H04L 61/251; H04L 2101/659; H04L 63/0272; H04L 63/029; H04L 67/146; H04L 67/02; H04L 67/2842; H04L 12/28; H04L 29/08; H04L 29/06; G06F 16/955
See application file for complete search history.

(56) References Cited

U.S. PATENT DOCUMENTS 11,595,347 B1 *   2/2023  Shevade .............. H04W 8/26
2010/0309813 A1  12/2010  Singh et al.
(Continued)

FOREIGN PATENT DOCUMENTS

CN    108243249 A    7/2018
CN    109543121 A    3/2019
(Continued)

OTHER PUBLICATIONS

International Search Report for corresponding application PCT/CN2020/139481 filed Dec. 25, 2020; Mail date Sep. 6, 2021.

*Primary Examiner* — Iqbal Zaidi
(74) *Attorney, Agent, or Firm* — Samson G. Yu (57) ABSTRACT

This application discloses a processing method and device for external link rewiring. The method includes: IPv6 access service initiated by a client is responded to obtain a first page content, the first page content is processed to obtain a second page content, IPv4 detection service runs at the client according to the second page content to determine IP protocol stack information at the client, and the request initiated by the client is determined whether to perform the external link rewriting according to the IP protocol stack information. Through this application, the problem that the performance of the gateway device is affected because the external link requested at all clients is rewritten through the gateway device in the related art is solved.

9 Claims, 3 Drawing Sheets

(56) References Cited

U.S. PATENT DOCUMENTS

| | | | |
|---|---|---|---|
| 2015/0281251 A1 | 10/2015 | Lin | |
| 2019/0104059 A1* | 4/2019 | Surcouf | .................. H04L 67/63 |
| 2022/0311734 A1* | 9/2022 | Boucadair | ........... H04L 61/4511 |

FOREIGN PATENT DOCUMENTS

| | | |
|---|---|---|
| CN | 111107056 A | 5/2020 |
| CN | 111416862 A | 7/2020 |

* cited by examiner

PROCESSING METHOD AND DEVICE FOR EXTERNAL LINK REWRITING

TECHNICAL FIELD

This application relates to the field of network communication technologies, in particular to a processing method and device for external link rewriting.

BACKGROUND

During an Internet Protocol Version 6 (IPv6) renovation process, for an external link on a renovated website, a widely used practice is to rewrite external link contents in a webpage through a Network Address Translation (NAT64) gateway or a similar device. The external link, that needs to be rewritten, is rewritten to a domain name or an IPv6 address served by the NAT64 gateway or the similar device, and then an access to the external link is drained to the NAT64 gateway. Since the NAT64 gateway works in IPv6 and Internet Protocol Version 4 (IPv4) dual-stack models at the same time, a request on the IPv6 is agented, a website pointed by a true external link is sent through an IPv4 network, and then an IPv6 client can access another external link not providing IPv6 service on this website. The current implementation manner is that unnecessary waste is caused to the performance of the NAT64 gateway and the performance of the NAT64 gateway is affected because the external link requested at all clients is rewritten through the NAT64 gateway or the similar gateway device.

For a problem that the performance of the gateway device is affected because the external link requested at all clients is rewritten through the gateway device in the related art, no effective solution has been proposed at present.

SUMMARY

The main purpose of this application is to provide a processing method and device for external link rewriting to solve the problem that the performance of the gateway device is affected because the external link requested at all clients is rewritten through the gateway device in the related art.

In order to implement the above purpose, according to one aspect of this application, a processing method for external link rewriting is provided. The method includes: IPv6 access service initiated by a client is responded to obtain a first page content, the first page content is processed to obtain a second page content, IPv4 detection service runs at the client according to the second page content to determine IP protocol stack information at the client, and a request initiated by the client is determined whether to perform the external link rewriting according to the IP protocol stack information.

Further, the request initiated by the client is determined whether to perform the external link rewriting according to the IP protocol stack information, includes: when the IP protocol stack information is IPv4/IPv6 dual-stack, the request initiated by the client is refused to perform the external link rewriting, and when the IP protocol stack information is IPv6 single-stack, the request initiated by the client is performed to the external link rewriting.

Further, the first page content is processed to obtain the second page content, includes: an IPv4 detection script is inserted into the first page content, and is setted the first page content containing IPv4 detection script as the second page content.

Further, IPv4 detection service runs at the client according to the second page content to determine the IP protocol stack information at the client, includes: the IPv4 detection script is executed at the client. Herein the IPv4 detection script is configured with an IPv4 network service address, an IPv4 detection request is initiated to the IPv4 network service address to obtain an IPv4 detection request result, and the IP protocol stack information at the client is determined according to the IPv4 detection request result.

Further, the IP protocol stack information at the client is obtained according to the IPv4 detection request result, including: the client is determined whether or not to establish a connection to the IPv4 network service address according to the IPv4 detection request result. When the client is successfully connected to the IPv4 network service address, the IP protocol stack information at the client is determined as the IPv4/IPv6 dual-stack, and when the client is not successfully to connect to the IPv4 network service address, the IP protocol stack information at the client is determined as the IPv6 single-stack.

Further, after obtaining the IP protocol stack information at the client according to the IPv4 detection request result, the method further includes: when the IP protocol stack information at the client is the IPv6 single-stack, an identifier of the client is set as a first identifier, and when the IP protocol stack information at the client is the IPv4/IPv6 dual-stack, the identifier of the client is set as a second identifier.

Further, the response requested by the client is determined whether to perform the external link rewriting according to the IP protocol stack information, includes: the identifier of the client is identified. when the identifier of the client is the second identifier, the request initiated by the client is refused to perform the external link rewriting, and when the identifier of the client is the first identifier, the request initiated by the client is performed to the external link rewriting.

Further, the method is applied to a system including the client, the NAT64 and a server. Before responding to the IPv6 access service initiated by the client, the method includes: a Hyper Text Transport Protocol (HTTP) service is deployed on the NAT64 gateway, so as to make the NAT64 gateway to provide the IPv4 access service to the client.

In order to achieve the above mentioned purpose, according to another aspect of this application, a processing device for external link rewriting is provided. The device includes a first obtainment unit, a second obtainment unit, a first determination unit and a second determination unit. The first obtainment unit is configured to respond to IPv6 access service initiated by a client to obtain a first page content, the second obtainment unit is configured to process the first page content to obtain a second page content, the first determination unit is configured to run IPv4 detection service at the client according to the second page content to determine IP protocol stack information at the client, and the second determination unit is configured to determine whether to perform the external link rewriting on a request initiated by the client according to the IP protocol stack information.

Further, the second determination unit further includes a first judging module and a second judging module. The first judging module is configured to resufsed to perform the external link rewriting on the request initiated by the client when the IP protocol stack information is IPv4/IPv6 dual-stack, and the second judging module is configured to perform the external link rewriting on the request initiated by the client when the IP protocol information is IPv6 single-stack.

Further, the second obtainment unit further includes a first embedding module, which is configured to insert an IPv4 detection script into the first page content, and is setted the first page content containing the IPv4 detection script as the second page content.

Further, the first determination unit further includes a first execution module, a first request module and a first determining module. The first execution module is configured to execute the IPv4 detection script at the client, and the IPv4 detection script is configured with an IPv4 network service address, the first request module is configured to initiate an IPv4 detection request to the IPv4 network service address to obtain an IPv4 detection request result, and the first determining module is configured to determine the IP protocol stack information at the client according to the IPv4 detection request result.

Further, the first determining module further includes a first judging sub-module, a first determining sub-module and a second determining sub-module. The first judging sub-module is configured to determine whether or not a connection is established between the client and the IPv4 network service address according to the IPv4 detection request result, the first determining sub-module is configured to determine the IP protocol stack information at the client as the IPv4/IPv6 dual-stack when the client is successfully connected to the IPv4 network service address, and the second determining sub-module is configured to determine the IP protocol stack information at the client as the IPv6 single-stack when the client is not successfully to connect to the IPv4 network service address.

Further, the device further includes a first setting unit and a second setting unit. The first setting unit is configured to set an identifier of the client as a first identifier when the IP protocol stack information at the client is the IPv6 single-stack after the IP protocol stack information at the client is obtained according to the IPv4 detection request result, and the second setting unit is configured to set the identifier of the client as a second identifier when the IP protocol stack information at the client is the IPv4/IPv6 dual-stack after the IP protocol stack information at the client is obtained according to the IPv4 detection request result.

Further, the second determination unit further includes a first identifying module, a second identifying module and a third identifying module. The first identifying module is configured to identify the identifier of the client, the second identifying module is configured to refused to perform the external link rewriting on the request initiated by the client when the identifier of the client is the second identifier, and the third identifying module is configured to perform the external link rewriting on the request initiated by the client when the identifier of the client is the first identifier.

Further, the device is applied to a system including the client, a Network Address Translation 64 (NAT64) gateway and a server. The device further includes a first deploying unit, which is configured to deploy the HTTP service on the NAT64 gateway before responding to the IPv6 access service initiated by the client, so as to make the NAT64 gateway to provide the IPv4 access service to the client.

Through this application, the problem that the performance of the gateway device is affected because the external link requested at all clients is rewritten through the gateway device in the related art is solved through the following steps: the IPv6 access service initiated by the client is responded to obtain the first page content, the first page content is processed to obtain the second page content, the IPv4 detection service runs at the client according to the second page content to determine the IP protocol stack information at the client, and the request initiated by the client is determined whether to perform the external link rewriting according to the IP protocol stack information. This application enables the gateway device to perform selective writing on the external link requested by the client through running the IPv4 detection service at the client and determining the IP protocol stack information at the client, and then determining whether to perform the external link rewriting on the request initiated by the client according to the IP protocol stack information, thereby avoiding rewriting the external link that does not need to be rewritten, avoiding causing resource waste, and then achieving an effect of improving the gateway performance.

BRIEF DESCRIPTION OF THE DRAWINGS

The drawings, which constitute a part of this application, are used to provide a further understanding of this application, and the exemplary embodiments of this application and the description thereof are used to explain this application, but do not constitute improper limitations to this application. In the drawings.

DETAILED DESCRIPTION OF THE EMBODIMENTS

It is to be noted that embodiments in this application and features in the embodiments may be combined with each other without conflict. This application will be described below in detail with reference to drawings and in combination with the embodiments.

In order to make those skilled in the art understand the solutions of this application better, the technical solutions in the embodiments of this application are clearly and completely elaborated below in combination with the accompanying drawings. It is apparent that the described embodiments are only a part of the embodiments of this application but not all. Based on the embodiments of this application, all the other embodiments obtained by those of ordinary skill in the art on the premise of not contributing creative effort should belong to the protection scope of this application.

It should be noted that terms "first", "second" and the like in the description, claims and the above mentioned drawings of this application are adopted not to describe a specific sequence but to distinguish similar objects. It should be understood that the terms used in such a way may be exchanged where appropriate, in order that the embodiments of this application described here can be described here. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

For convenient description, some of the terms or terms involved in the embodiments of this application are described below.

IPv6: the abbreviation of Internet Protocol version 6, and the next generation IP protocol designed by Internet Engineering Task Force (IETF) to replace IPv4.

NAT64 gateway: a stateful network address and protocol transition technology.

External link: referring, to a link that imports oneself website in another website.

HTTP: request-response protocol.

davascript: an object-based and event-driven interpreted scripting language with safety performance, directly embed into a HTTP page without compiling.

According to embodiments of this application, a processing method for external link rewriting is provided.

Figure 1:
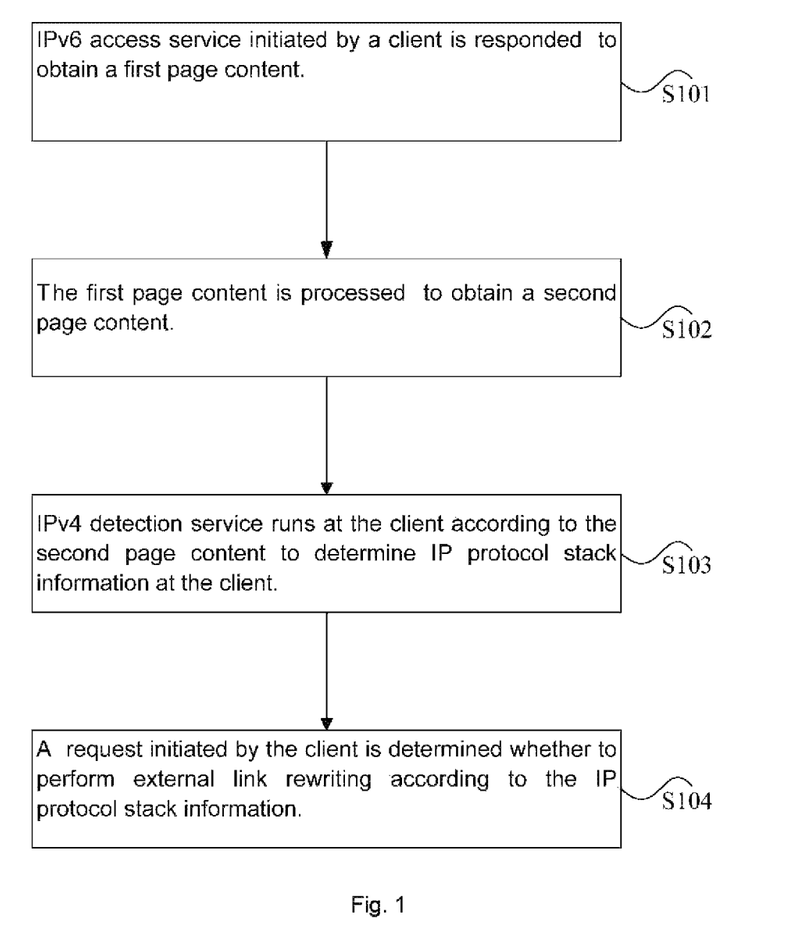
FIG. 1 is a flowchart of a processing method for external link rewriting according to one embodiment of this application.

FIG. 1 is a flowchart of a processing method for external link rewriting, according to one embodiment of this application. As shown in FIG. 1, the method includes the following steps.

At S101, IPv6 access service initiated by a client is responded to obtain a first page content.

In some application scenes, a server providing network access uses an IPv4 protocol, and the client may use an IPv6 single-stack protocol or an IPv4/IPv6 dual-stack protocol. In order to provide all clients with normal network access service, the client needs to execute network access through a NAT64 gateway. When the network access is required, the client initiates an access request, the NAT64 gateway responds to the access request at the client to convert an access link corresponding to the IPv6 access service initiated by the client, and then the converted link is sent to a back-end server of an IPv4 network to obtain a webpage content returned by the server. For example, the client initiates the access of http://www.hillstonenet.com.cn through an IPv6 network, and the NAT64 gateway responds to the request of the client to perform NAT64 conversion on the link. The converted link is sent to the back-end server of the IPv4 network, and then a page content returned by the back-end server is obtained.

At S102, the first page content is processed to obtain a second page content.

When an IPv6 single-stack client performs the network access, problems of a skylight and the external link may occur to the client. Even the external link in an IPv4/IPv6 dual-stack client does not provide IPv6 service, the client still may use the IPv4 network for access, therefore the skylight problem existing in the IPv6 single-stack client does not exist in the IPv4/IPv6 dual-stack client. However, the NAT64 gateway cannot recognize whether or not the client IP protocol stack is the IPv6 single-stack or IPv4/IPv6 dual-stack in the related art, the responses corresponding to a great number of IPv4/IPv6 dual-stack client requests are subjected to unnecessary rewriting, thereby resulting in low efficiency. Therefore, the external link rewriting method provided by the embodiments of this application, through obtaining the IP protocol stack information at the client, namely, obtaining whether or not the client is the IPv6 single-stack network or the IPv4/IPv6 dual-stack network, and on this basis, the request initiated by the client is determined whether to perform the external link rewriting according to the IP protocol stack information at the client. In order to enable the NAT64 gateway to obtain the IP protocol stack information at the client, namely, obtain whether or not the client is the IPv6 single-stack network or IPv4/IPv6 dual-stack network, after the NAT64 gateway responds to a network access request of the client and obtains the first page content returned by the server, the first page content needs to be processed to obtain the second page content, and then the second page content is run through the client to obtain the IP protocol stack information at the client.

Optionally, in the processing method for the external link rewriting provided by the embodiments of this application, the first page content is processed to obtain the second page content, including: an IPv4 detection script is inserted into the first page content, and set the first page content containing the IPv4 detection script as the second page content.

Compared with the NAT64 gateway in the related art, in the method for the external link rewriting provided by the embodiments of this application, the NAT64 gateway needs to provide extra IPv4 HTTP service, so that the client of the IPv4 network can execute access, and the client is detected whether or not to work in the IPv4 network based on the service. For obtaining the IP protocol stack information at the client, the IPv4 detection script needs to be inserted into the first page content after the NAT64 gateway obtains the first page corresponding to the client network access request. The IPv4 detection script is provided by the NAT64 gateway. When the client requests a page by the IPv6 service, the NAT64 gateway inserts the script into the corresponding content. When the script is executed at the client, any original logic and display layout of the page are not affected.

At S103, IPv4 detection service runs at the client according to the second page content to determine the IP protocol stack information at the client.

After the client receives the second page returned by the NAT64 gateway, the content of the second page is loaded. Since the second page not only includes the normal webpage content requested by the client, but also the IPv4 detection script is inserted into the second page, and when the webpage content is normally loaded at the client, the IPv4 detection script is executed. The client may determine the IF protocol stack information at the client by executing the IPv4 detection script.

Optionally, in the processing method for the external link rewriting provided by the embodiments of this application, the IPv4 detection service runs at the client according to the second page content to determine the IP protocol stack information at the client, includes: the IPv4 detection script is executed at the client. Herein, the IPv4 detection script is configured with the IPv4 network service address, the IPv4 detection request is initiated to the IPv4 network service address to obtain the IPv4 detection request result, and the IP protocol stack information at the client is determined according to the IPv4 detection request result.

The NAT64 gateway responds to the request of accessing the network service at the client, and the page content returned by the server is obtained. The IPv4 detection script is inserted into the page content, and the webpage content, after the IPv4 detection script is inserted, is returned to the client. The detection script is configured to execute the IPv4 detection service at the client. In addition to executing the normal page rendering and logic, the client executes the IPv4 detection script additionally after receiving the second page content. For example, the detection service address is set to http://ipv4/ipv4-test.html through the NAT64 gateway in the detection script. Herein, "ipv4" is an IPv4 network address, thus when the IPv4 detection script is executed at the client, a network access request for the address http://ipv4/ipv-test.html is attempted to be initiated, and the IP protocol stack information at the client is determined according to the access request result of the address.

Optionally, in the processing method for the external link rewriting provided by the embodiments of this application, the IP protocol stack information at the client is obtained according to the IPv4 detection request result, includes: determining whether or not a connection is established between the client and the IPv4 network service address according to the IPv4 detection request result. when the client is successfully connected to the IPv4 network service address, the IP protocol stack information at the client is determined as the IPv4/IPv6 dual-stack. When the client is not successfully to connect to the IPv4 network service address, the IP protocol stack information at the client is determined as the IPv6 single-stack.

When the IPv4 detection script is executed at the client and the IPv4 network service address configured in the detection script is accessed, the client is determined whether or not to establish a connection to the IPv4 network service address according to the access request result, and then the client is determined as the IPv4/IPv6 dual-stack or the IPv6 single-stack. VVhen the client displays that the access result of the preset IPv4 network service address can be normally connected, the NAT64 gateway has any response to the access request at the client, indicating that the client may access the service of the IPv4 service, and the IP protocol stack information at the client is determined as the IPv4/IPv6 dual-stack network. When the access result displays that the connection is not established with the preset IPv4 network service address, indicating that the client may not access the IPv4 detection server provided by the NAT64, and the IP protocol stack information at the client is determined as the IPv6 single-stack.

Optionally, in the processing method for the external link rewriting provided by the embodiments of this application, after the IP protocol information at the client is obtained according to the IPv4 detection request result, the method further includes: when the IP protocol stack information at the client is the IPv6 single-stack, the identifier of the client is set as the first identifier, and if the IP protocol stack information at the client is the IPv4/IPv6 dual-stack, the identifier of the client is set as the second identifier.

When the client sends out an external link access request through the NAT64 gateway, the NAT64 determines whether to rewrite the external link accessed by the client according to the IP protocol stack information at the client. For enabling the NAT64 gateway to accurately judge the IP protocol stack information (IPv4/IPv6 dual-stack or IPv6 single-stack) at the client, a corresponding identifier is set to the client in this application. When the client is in the IPv4/IPv6 dual-stack network, the identifier of the client is set as the second identifier. when the client is in the IPv6 single-stack network, the identifier of the client is set as the first identifier. Thus, when the client initiates the external link access request through the NAT64 gateway, the NAT64 gateway may quickly judge whether or not the client is the IPv4/IPv6 dual-stack or IPv6 single-stack according to the identifier of the client. For example, when the client is the IPv4/IPv6 dual-stack, Section Cookie at the client is set as 1 (corresponding to the above mentioned second identifier), and when the client is the IPv6 single-stack, the Section Cookie at the client is set as 0 (corresponding to the above mentioned first identifier). Setting Session Cookie may ensure that the subsequent access from the client to the website may take the Session Cookie before the client closes a browser, and the NAT64 gateway may quickly determine the IP protocol stack information at the client according to a Session Cookie value at the client.

At S104, the request initiated by the client is determined whether to perform the external link rewriting according to the IP protocol stack information.

Optionally, in the processing method for the external link rewriting provided by the embodiments of this application, the request initiated by the client is determined whether to perform the external link rewriting according to the IP protocol stack information, includes: when the IP protocol stack information is the IPv4/IPv6 dual-stack, the request initiated by the client is refused to perform the external link rewriting, and when the IP protocol stack information is the IPv6 single-stack, the request initiated by the client is to perform the external link rewriting.

When the IPv6 single-stack client performs the network access, problems of the skylight and the external link may occur to the client. Even the external link in the IPv4/IPv6 dual-stack client does not provide IPv6 service, the client still may use the IPv4 network for access, therefore the skylight problem existing in the IPv6 single-stack client does not exist in the IPv4/IPv6 dual-stack client. However, the NAT64 gateway cannot recognize whether or not the client IP protocol stack is the IPv6 single-stack or IPv4/IPv6 dual-stack in the related art, the responses corresponding to a great number of IPv4/IPv6 dual-stack client requests are subjected to unnecessary rewriting, thereby resulting in low efficiency. Therefore, the external link rewriting method provided by the embodiments of this application, through obtaining the IP protocol stack information at the client, namely, obtaining whether or not the client is the IPv6 single-stack network or the IPv4/IPv6 dual-stack network, and on this basis, the request initiated by the client is determined whether to perform the external link rewriting according to the IP protocol stack information at the client. That is, the response requested by the client at the IPv4/IPv6 dual-stack network is refused to perform the external link rewriting, and the response requested by the client at the IPv6 single-stack network is to perform the external link rewriting, thereby avoiding unnecessary writing on a greater number of response corresponding to the IPv4/IPv6 dual-stack client and avoiding the gateway resource waste, and then the external link requested by the client is selectively modified through the gateway device, so that the effect of improving the performance of the NAT64 gateway is achieved.

Optionally, in the processing method for the external link rewriting provided by the embodiments of this application, the response requested by the client is determined whether to perform the external link rewriting according to the IP protocol stack information, includes: the identifier of the client is identified, when the identifier of the client is the second identifier, the request initiated by the client is refused to perform the external link rewriting, and when the identifier of the client is the first identifier, the request initiated by the client is performed the external chain rewriting.

The client reflects the IP protocol stack information through setting Cookie as the first identifier or the second identifier. When receiving the request from the client, the NAT64 gateway analyses the Cookie in the request to judge whether or not the client is in the IPv4/IPv6 dual-stack network. When the client is identified as the second identifier, indicating that the client is the IPv4/IPv6 dual-stack network, the client may access the renovated website through the IPv6, and even the external link in the second identifier does not provide the IPv6 service, the client may still use the IPv4 network for accessing. The NAT64 gateway does not need to perform the external link rewriting on the request initiated by the client. When the identifier of the client is identified as the second identifier, indicating that the client is the IPv6 single-stack network, the client accesses the renovated website through IPv6 only, and When the requested external link does not provide the IPv6 service, the client cannot normally access the website, therefore the NAT64 performs the external link rewriting on the request initiated by the client identified as the first identifier.

Optionally, in the processing method for the external link rewriting provided by the embodiments of this application, the method is applied to the system including the client, the NAT64 gateway and the server. Before responding to the IPv6 access service initiated by the client, the method includes: the HTTP service of IPv4 is deployed on the NAT64 gateway, so as to make the NAT64 gateway to provide the IPv4 access service to the client.

Usually, the NAT64 gateway is mainly applied to provide IPv6 and IPv4 service externally and perform the same external link rewriting for the access of all clients. Although meeting the normal loading of the client to the webpage and solving the problems of skylight and external link of the IPv6 single-stack client, a great number of response corresponding to the dual-stack client request is performed unnecessary rewriting, the unnecessary waste is caused to the performance of the NAT64 gateway, and the experience of the dual-stack client is reduced. In order to identify the IP protocol stack type at the client, the external link rewriting is only provided to the IPv4 single-stack client, rather than the IPv4/IPv6 dual-stack client. The HTTP service of IPv4 needs to be deployed on the NAT64 gateway in advance, so that the client determines the IP protocol stack type of the client through accessing the IPv-4 based HTTP service provided on the NAT64 gateway.

Therefore, through the processing method for the external link rewriting provided by the embodiments of this application, the NAT64 gateway can obtain the IP protocol stack information at the client, namely, obtain whether or not the client is the IPv6 single-stack network and the IPv4/IPv6 dual-stack network, and then the response requested by the client at the IPv4/IPv6 dual-stack network is refused to perform the external link rewriting, thus the performance of the NAT64 gateway may be effectively optimized, and the use experience of the dual-stack network client is improved.

Figure 2:
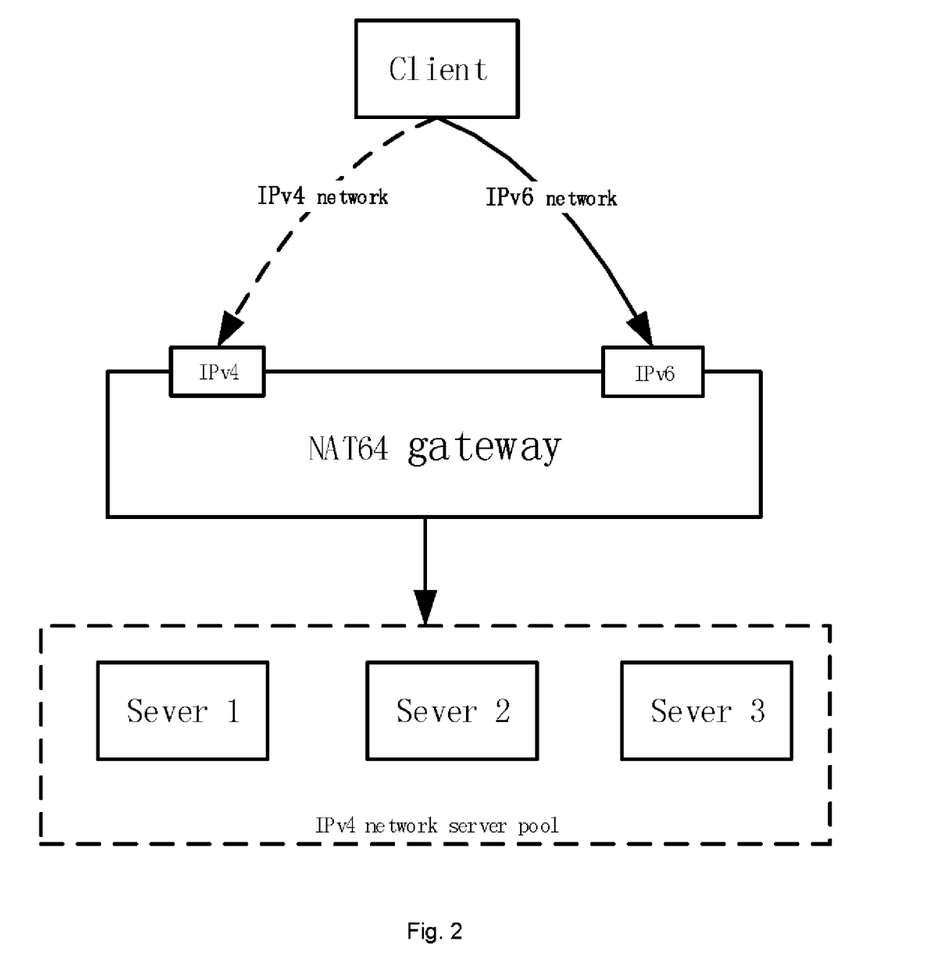
FIG. 2 is a schematic diagram of a processing system for external link rewriting according to one embodiment of this application.

FIG. 2 is a schematic diagram of a processing system for external link rewriting according to one embodiment of this application. As shown in FIG. 2, the client firstly initiates the network access request through the IPv6 network, for example, the external link initiating the request is http://www.hillstonenet.com.cn. The NAT64 gateway cannot judge the IP protocol stack type of the client, so the external link is performed NAT64 conversion and sent to the back-end network service, which returns the response. The NAT64 gateway inserts the IPv4 detection script in the webpage content returned at the back end, and returns the webpage content after inserting the IPv4 detection script to the client. For example, the NAT64 gateway may set the detection service as http://ipv4/ipv4-test.html in the IPv4 detection script, and "ipv4" is the IPv4 network address. In addition to executing the normal page rendering and logic, the client executes the IPv4 detection script additionally after receiving the response. VVhen executing the detection script, the client tries to initiate the access request to a link of http://ipv4/ipv4-test.html. When the access request is not reached, indicating that the client is the IPv6 single-stack network, and the IPv4 detection service provided by NAT64 cannot be accessed. When a connection can be normally established, indicating that the client is the IPv4/IPv6 dual-stack network, and the IPv4 detection service provided by the NAT64 may be accessed. The client sets the corresponding identifier according to the detection result, and the NAT64 determines the IP protocol stack information at the client according to the identifier. For the IPv4/IPv6 dual-stack network client, the NAT6 gateway does not make any external link rewriting, and for the IPv6 single-stack network client, the NAT64 gateway needs to make the corresponding external chain rewriting.

Figure 3:
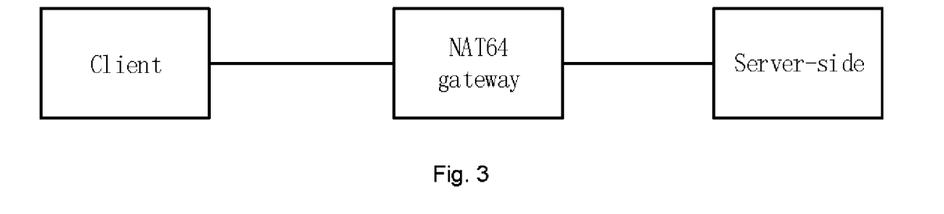
FIG. 3 is a schematic diagram of a processing system application scene for external link rewriting according to one embodiment of this application.

FIG. 3 is a schematic diagram of a processing system application scene for external link rewriting according to one embodiment of this application. The client performs the network access request through the NAT64 gateway, which identifies the IP protocol stack information at each client through the identification value in the client access request, thereby only performing the external link rewriting on IPv6 single-stack network client (only access IPv6 external link), rather than performing the external link rewriting on the IPv4/IPv6 dual-stack network client. The solution provided by the disclosure may reduce the unnecessary external link rewriting operation, effectively optimize the performance of the NAT64 gateway and improve the using experience of the dual-stack network client.

In conclusion, according to the processing method for the external link rewriting provided by the embodiments of this application, the IPv6 access service initiated by the client is responded to obtain the first page content, the first page is processed to obtain the second page content, the IPv4 detection service runs according to the second page content to determine the IP protocol stack information at the client, and the request initiated by the client is determined whether to perform the external link rewriting according to the IP protocol stack information. Through this application, the problem that the performance of the gateway device is affected because the external link requested at all clients is rewritten through the gateway device in the related art, so the NAT64 gateway device selectively rewrites the external link requested by the client, thereby avoiding the gateway resource waste caused by rewiring the external link that does not need to be rewritten, and achieving the effect of improving the gateway performance.

It should be noted that the steps presented in the flowchart of the drawings can be executed in a computer system like a group of computer executable instructions, and moreover, although a logical sequence is shown in the flow chart, in some cases, the presented or described steps can be performed in a sequence different from that described here.

Embodiments of this application further provide a processing device for external link rewriting. It should be noted that the processing device for the external link rewriting in the embodiments of this application may be configured to execute the processing method for the external link rewiring provided by the embodiments of this application. The processing device for the external link rewriting provided by the embodiments of this application is described in details below.

Figure 4:
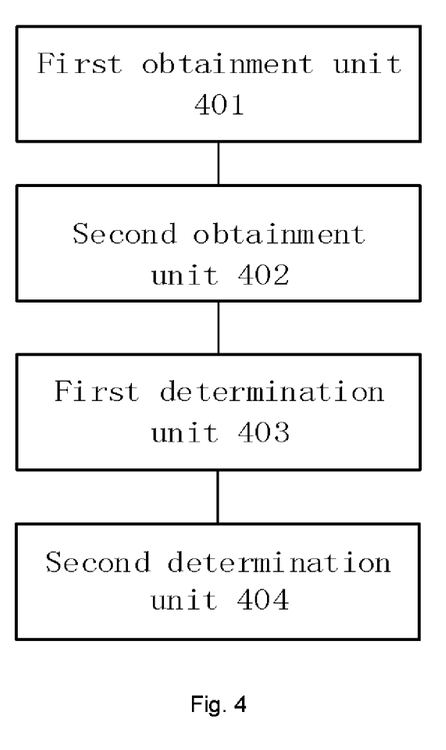
FIG. 4 is a schematic diagram of a processing device for external link rewriting according to one embodiment of this application.

FIG. 4 is a schematic diagram of a processing device for external link rewriting according to one embodiment of this application. As shown in FIG. 4, the device includes a first obtainment unit 401, a second obtainment unit, 402 a first determination unit 403 and a second determination unit 404.

Specifically, the first obtainment unit 401 is configured to respond to IPv6 access service initiated by a client to obtain a first page content.

The second obtainment unit 402 is configured to process the first page content to obtain a second page content.

The first determination unit 403 is configured to run IPv4 detection service at the client according to the second page content to determine the IP protocol stack information at the client.

The second determination unit 404 is configured to determine whether to perform the external link rewriting on a request initiated by the client according to the IP protocol stack information.

In conclusion, according to the processing device for the external link rewriting provided by the embodiments of this application, the IPv6 access service initiated by the client is responded through the first obtainment unit 401 to obtain the first page content, the first page content is processed through the second obtainment unit 402 to obtain the second page content, the first determination unit 403 runs the IPv4 detection service at the client according to the second page content to determine the IP protocol stack information at the client, and the second determination unit 404 determines whether to perform the external link rewriting on the request initiated by the client according to the IP protocol stack information. The problem that the performance of the gateway device is affected because the external link requested at all clients is rewritten through the gateway device in the related art. This application determines the IP protocol stack information at the client through running the IPv4 detection service at the client, and then the request initiated by the client is determined whether to perform the external link rewriting according to the IP protocol stack information, so that the gateway device selectively rewrites the external link requested by the client, thereby avoiding rewriting the external link that does not need to be rewritten, avoiding the gateway resource waste, and achieving the effect of improving the gateway performance.

Optionally, in the processing device for the external link rewriting provided by the embodiments of this application, the second determination unit 404 further includes a first judging module and a second judging module. The first judging module is configured refusing to perform the external link rewriting on the request initiated by the client when the IP protocol stack information is IPv4/IPv6 dual-stack, and the second judging module is configured to perform the external link rewriting on the request initiated by the client when the IP protocol information is IPv6 single-stack.

Optionally, in the processing device for the external link rewriting provided by the embodiments of this application, the second obtainment unit 402 further includes a first embedding module, which is configured to insert an IPv4 detection script into the first page content, and to set the first page content containing the IPv4 detection script is inserted as the second page content.

Optionally, in the processing device for the external link rewriting provided by the embodiments of this application, the first determination unit 403 further includes a first execution module, a first request module and a first determining module. The first execution module is configured to execute the IPv4 detection script at the client, and an IPv4 network service address is configured in the IPv4 detection script, the first request module is configured to initiate an IPv4 detection request to the IPv4 network service address to obtain an IPv4 detection request result, and the first determining module is configured to determine the IP protocol stack information at the client according to the IPv4 detection request result.

Optionally, in the processing device for the external link rewriting provided by the embodiments of this application, the first determining module further includes a first judging sub-module, a first determining sub-module and a second determining sub-module. The first judging sub-module is configured to determine whether or not the client can successfully establish a connection to the IPv4 network service address according to the IPv4 detection request result, the first determining sub-module is configured to determine the IP protocol stack information at the client as the IPv4/IPv6 dual-stack when the client is successfully connected to the IPv4 network service address, and the second determining sub-module is configured to determine the IP protocol stack information at the client as the IPv6 single-stack when the client is not successfully to connect to the IPv4 network service address.

Optionally, in the processing device for the external link rewriting provided by the embodiments of this application, the device further includes a first setting unit and a second setting unit. The first setting unit is configured to set an identifier of the client as a first identifier when the IP protocol stack information at the client is the IPv6 single-stack after the IP protocol stack information at the client is obtained according to the IPv4 detection request result, and the second setting unit is configured to set the identifier of the client as a second identifier when the IP protocol stack information at the client is the IPv4/IPv6 dual-stack after the IP protocol stack information at the client is obtained according to the IPv4 detection request result.

Optionally, in the processing device for the external link rewriting provided by the embodiments of this application, the second determination unit 404 further includes a first identifying module, a second identifying module and a third identifying module. The first identifying module is configured to identify the identifier of the client, the second identifying module is not configured to perform the external link rewriting on the request initiated by the client when the identifier of the client is the second identifier, and the third identifying module is configured to perform the external link rewriting on the request initiated by the client when the identifier of the client is the first identifier.

Optionally, in the processing device for the external link rewriting provided by the embodiments of this application, the device is applied to a system including the client, the NAT64 gateway and the server. The device further includes a first deploying unit, which is configured to deploy the HTTP service on the NAT64 gateway before responding to the IPv6 access service initiated by the client, so as to make the NAT64 gateway to provide the IPv4 access service to the client.

The processing device for the external link rewriting includes a processor and a memory. The above mentioned first obtainment unit 401, the second obtainment unit 402, the first determination unit 403 and the second determination unit 404 are stored in the memory as program units, and the above mentioned program units stored in the memory are executed by the processor to implement the corresponding function.

The processor includes a kernel, which can call the corresponding program unit in the memory. One or more kernels may be set, and the external rewriting processing is performed by adjusting the kernel parameters.

The memory may include forms of a volatile memory in a computer-readable medium, a Random Access Memory (RAM) and/or a volatile memory and the like, such as a Read-Only Memory (ROM) or a flash RAM), and the memory includes at least one storage chip.

The embodiments of the disclosure provide a storage medium, wherein the storage medium stores a stored program. When executed by the processor, the program implements the processing method for the external link rewriting.

The embodiments of the disclosure provide a processor, which is configured to run a program. When running, the program executes the processing method for the external link rewriting.

The embodiments of the disclosure provide a device, which includes a processor, a memory and a program stored on the memory and it is capable of running on the processor. When the processor executes the program, the following steps are implemented: IPv6 access service initiated by the client is responded to obtain the first page content, the first page content is processed to obtain the second page content, the IPv4 detection service runs at the client according to the second page content to determine IP protocol stack information at the client, and the request initiated by the client is determined whether to perform the external link rewriting according to the IP protocol stack information.

When executing the program, the processor further includes the following steps: when the IP protocol stack information is IPv4/IPv6 dual-stack, the request initiated by the client is refused to perform the external link rewriting, and when the IP protocol stack information is IPv6 single-stack, the request initiated by the client is performed the external link rewriting.

When executing the program, the processor further includes the following steps: the IPv4 detection script is inserted into the first page content, and is setted the first page content containing the IPv4 detection script as the second page content.

When executing the program, the processor further includes the following steps: the IPv4 detection script is executed at the client. Herein the IPv4 detection script is configured with an IPv4 network service address, an IPv4 detection request is initiated to the IPv4 network service address to obtain an IPv4 detection request result, and the IP protocol stack information at the client is determined according to the IPv4 detection request result.

When executing the program, the processor further includes the following steps: the client is determined whether or not to establish a connection to the IPv4 network service address according to the IPv4 detection request result. When the client is successfully connected to the IPv4 network service address, the IP protocol stack information at the client is determined as the IPv4/IPv6 dual-stack, and when the client is not successfully to connect to the IPv4 network service address, the IP protocol stack information at the client is determined as the IPv6 single-stack.

When executing the program, the processor further includes the following steps: when the IP protocol stack information at the client is the IPv6 single-stack, an identifier of the client is set as a first identifier, and when the IP protocol stack information at the client is the IPv4/IPv6 dual-stack, the identifier of the client is set as a second identifier.

When executing the program, the processor further includes the following steps: the identifier of the client is identified, when the identifier of the client is the second identifier, the request initiated by the client is refused to perform the external link rewriting, and when the identifier of the client is the first identifier, the request initiated by the client is performed the external link rewriting.

When executing the program, the processor further includes the following steps: the HTTP service of the IPv4 is deployed on the NAT64 gateway, so as to make the NAT64 gateway to provide the IPv4 access service to the client. The device herein may be a server, a Personal Computer (PC), a pad, a mobile phone, etc.

The disclosure further provides a computer program product, which is suitable for executing the initialized program in following method steps when it is executed on a data processing device: the IPv6 access service initiated by the client is responded to obtain the first page content, the first page content is processed to obtain a second page content, IPv4 detection service runs at the client according to the second page content to determine IP protocol stack information at the client, and the request initiated by the client is determined whether to perform the external link rewriting according to the IP protocol stack information.

When executing on the data processing device, the computer program product is also suitable for executing the initialized program in following method steps: when the IP protocol stack information is IPv4/IPv6 dual-stack, the request initiated by the client is refused to perform the external link rewriting, and when the IP protocol stack information is IPv6 single-stack, the request initiated by the client is performed the external link rewriting.

When executing on the data processing device, the computer program product is also suitable for executing the initialized program in following method steps: the IPv4 detection script is inserted into the first page content, and is setted the first page content containing the IPv4 detection script as the second page content.

When executing on the data processing device, the computer program product is also suitable for executing the initialized program in following method steps: the IPv4 detection script is executed at the client. Herein the IPv4 detection script is configured with an IPv4 network service address, an IPv4 detection request is initiated to the IPv4 network service address to obtain an IPv4 detection request result, and the IP protocol stack information at the client is determined according to the IPv4 detection request result.

When executing on the data processing device, the computer program product is also suitable for executing the initialized program in following method steps: determine whether or not a connection is established between the client and the IPv4 network service address according to the IPv4 detection request result, when the client is successfully connected to the IPv4 network service address, the IP protocol stack information at the client is determined as the IPv4/IPv6 dual-stack, and when the client is not successfully to connect to the IPv4 network service address, the IP protocol stack information at the client is determined as the IPv6 single-stack.

When executing on the data processing device, the computer program product is also suitable for executing the initialized program in following method steps: when the IP protocol stack information at the client is the IPv6 single-stack, the identifier of the client is set as the first identifier, and when the IP protocol stack information at the client is the IPv4/IPv6 dual-stack, the identifier of the client is set as the second identifier.

When executing on the data processing device, the computer program product is also suitable for executing the initialized program in following method steps: the identifier of the client is identified, when the identifier of the client is the second identifier, the request initiated by the client is refused to perform the external link rewriting, and when the identifier of the client is the first identifier, the request initiated by the client is performed the external link rewriting.

When executing on the data processing device, the computer program product is also suitable for executing the initialized program in following method steps: the HTTP service on the IPv4 is deployed on the NAT64 gateway, so as to make the NAT64 gateway to provide the IPv4 access service to the client.

Those skilled in the art may understand that embodiments of this application may be provided as methods, systems, or computer program products. Therefore, this application may adopt forms of complete hardware embodiments, complete software embodiments or embodiments integrating software and hardware. Moreover, this application may adopt the form of a computer program product implemented on one or more computer available storage media (including but not limited to a disk memory, a Compact Disc Read Only Memory (CD-ROM), an optical memory, etc.) containing computer available program codes.

This application is described with reference to flowcharts and/or block diagrams of the method, the device (system) and the computer program product according to the embodiments of this application. It should be understood that each flow and/or block in the flowchart and/or block diagram, and the combination of the flow and/or block in the flowchart and/or block diagram can be implemented by the computer program instructions. These computer program instructions can be provided to a processor of a general-purpose computer, a special-purpose computer, an embedded processor or other programmable data processing devices to generate a machine, so that instructions which are executed by the processor of the computer or other programmable data processing devices generate a device which is used for implementing the specified functions in one or more flows of the flowchart and/or one or more blocks of the block diagram.

These computer program instructions may also be stored in the computer-readable memory which can guide the computer or other programmable data processing devices to work in a particular way, so that the instructions stored in the computer-readable memory generate a product including an instruction device. The instruction device implements the specified functions in one or more flows of the flowchart and/or one or more blocks of the block diagram.

These computer program instructions may also be loaded on the computer or other programmable data processing devices, so that a series of operation steps are performed on the computer or other programmable data processing devices to generate the processing implemented by the computer, and the instructions executed on the computer or other programmable data processing devices provide the steps for implementing the specified functions in one or more flows of the flowchart and/or one or more blocks of the block diagram.

In a typical configuration, a computing device includes one or more than one Central Processing Unit (CPU), input/output interface, network interface, and memory.

The memory may include a volatile memory, a RAM and/or a nonvolatile memory, and other forms in computer readable media, for example, a ROM or a flash RAM. The memory is an example of the computer readable media.

The computer readable media include permanent and non-permanent, movable and non-movable media that can realize information storage by a variety of ways or technologies. The information may be computer-readable instructions, data structures, modules of a program, or other data. Examples of the computer storage media include: a Phase-Change Memory (PRAM), a Static Random Access Memory (SRAM), a Dynamic Random Access Memory (DRAM), other types of RAM, ROM, and Electrically Erasable Programmable Read-Only Memory (EEPROM), a flash memory or other memory technologies, a CD-ROM, a Digital Video Disk (DVD) or other optical memories and magnetic cassette tapes, magnetic tape disk storage or other magnetic storage devices or a variety of other non-transmission media, which may be configured to store information that can be accessed by the computing device. As defined in the specification, the computer readable media do not include computer-readable transitory media, such as modulated data signals and carriers.

It should be noted that terms "include" and "contain" or any other variant are intended to cover nonexclusive inclusions herein, so that a process, method, goods or device including a series of elements not only includes those elements but also includes other elements which are not clearly listed or further includes elements intrinsic to the process, the method, the goods or the device. Under the condition of no more limitations, an element defined by the statement "including a/an . . . " does not exclude existence of the same other elements in a process, method, goods or device including the element.

Those skilled in the art may understand that embodiments of the disclosure may be provided as methods, systems, or computer program products. Therefore, this application may adopt forms of complete hardware embodiments, complete software embodiments or embodiments integrating software and hardware. Moreover, this application may adopt the form of a computer program product implemented on one or more computer available storage media (including but not limited to a disk memory, a Compact Disc Read Only Memory (CD-ROM), an optical memory, etc.) containing computer available program codes.

The above is only preferred embodiments of the disclosure and is not intended to limit this application. Those skilled in the art may make various modifications and variations. Any modifications, equivalent replacements, improvements and the like made within the spirit and principle of the disclosure shall fall within the scope of protection of the disclosure.

What claimed is:

1. A processing method for external link rewriting, comprising:
    in response to an Internet Protocol Version 6 (IPv6) access service initiated by a client, obtaining a first page content;
    processing the first page content to obtain a second page content;
    running IPv4 detection service at the client according to the second page content to determine IP protocol stack information at the client;
    determining whether to rewrite an external link on a request initiated by the client according to the IP protocol stack information;
    wherein determining whether to rewrite the external link on the request initiated by the client according to the IP protocol stack information, comprising:
    refusing to rewrite the external link on the request initiated by the client, when the IP protocol stack information is IPv4/IPv6 dual-stack; and
    rewriting the external link on the request initiated by the client, when the IP protocol stack information is IPv6 single-stack.

2. The method as claimed in claim 1, wherein processing the first page content to obtain the second page content, comprising:
    inserting an IPv4 detection script into the first page content, and setting the first page content containing the IPV4 detection script as the second page content.

3. The method as claimed in claim 2, wherein running IPv4 detection service at the client according to the second page content to determine the IP protocol stack information at the client, comprising:
- executing the IPV4 detection script at the client, wherein the IPV4 detection script is configured with an IPv4 network service address;
- initiating an IPV4 detection request to an IPV4 network service address to obtain an IPV4 detection request result; and
- determining the IP protocol stack information at the client according to the IPV4 detection request result.

4. The method as claimed in claim 3, wherein determining the IP protocol stack information at the client according to the IPV4 detection request result, comprising:
- determining whether a connection is able to be established between the client and the IPv4 network service address according to the IPV4 detection request result;
- determining the IP protocol stack information at the client as the IPV4/IPV6 dual-stack, when the connection is successfully established between the client and the IPV4 network service address; and
- determining the IP protocol stack information at the client as the IPV6 single-stack, when the connection is not successfully established between the client and the IPV4 network service address.

5. The method as claimed in claim 4, wherein after determining the IP protocol stack information at the client according to the IPV4 request result, the method further comprising:
- setting an identifier of the client as a first identifier, when the IP protocol stack information at the client is the IPV6 single-stack; and
- setting the identifier of the client as a second identifier, when the IP protocol stack information at the client is the IPV4/IPv6 dual-stack.

6. The method as claimed in claim 5, wherein determining whether to rewrite the external link on the request initiated by the client according to the IP protocol stack information, comprising:
- identifying the identifier of the client;
- refusing to rewrite the external link on the request initiated by the client, when the client identifier is the second identifier; and
- rewriting the external link on the request initiated by the client, when the client identifier is the first identifier.

7. The method as claimed in claim 1, wherein the method is applied to a system comprising the client, a Network Address Translation 64 (NAT64) and a server; and before responding to the IPv6 access service initiated by the client, the method comprising:
- Deploying a Hyper Text Transport Protocol (HTTP) service of IPV4 on the NAT64 gateway, so as to make the NAT64 gateway to provide the IPv4 access service to the client.

8. A processing device for external link rewriting, a hardware processor coupled with a memory and configured to execute program units stored on the memory, wherein the program units comprising:
- a first obtainment unit, which is configured to in response to an Internet Protocol Version 6 (IPv6) access service initiated by a client, obtain a first page content;
- a second obtainment unit, which is configured to process the first page content to obtain a second page content;
- a first determination unit, which is configured to run IPv4 detection service at the client according to the second page content to determine the IP protocol stack information at the client; and
- a second determination unit, which is configured to determine whether to rewrite an external link on a request initiated by the client according to the IP protocol stack information;
- wherein the second determination unit comprising: a first judging module and a second judging module;
- the first judging module is configured to refuse to rewrite the external link on the request initiated by the client, when the IP protocol stack information is IPv4/IPV6 dual-stack; and
- the second judging module is configured to rewrite the external link on the request initiated by the client, when the IP protocol stack information is IPV6 single-stack.

9. A Non-Volatile storage medium, wherein the Non-Volatile storage medium stores a computer program/instruction, and when executed by a processor, the computer program/instruction implements the method according to claim 1.

* * * * *